United States Patent Office 3,542,752
Patented Nov. 24, 1970

3,542,752
CHEMICAL COMPOSITIONS
Joseph Adrian Hoffman, Bound Brook, N.J., assignor to American Cyanamid Company, Stamford, Conn., a corporation of Maine
No Drawing. Filed Feb. 7, 1966, Ser. No. 525,377
Int. Cl. C08d 5/00; C08f 1/88, 27/00
U.S. Cl. 260—94.7                 9 Claims

ABSTRACT OF THE DISCLOSURE

Compounds of the formula:

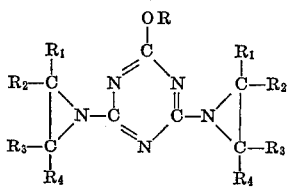

wherein R is an alkyl of up to ten carbon atoms or alkoxy-alkyl of up to ten carbon atoms in each alkyl grouping; and $R_1$, $R_2$, $R_3$ and $R_4$ are individually either hydrogen or alkyl of up to four carbon atoms and at least one of $R_1$, $R_2$, $R_3$ and $R_4$ is other than hydrogen, and the use of such compounds for curing or vulcanizing rubbery elastomers.

---

This invention relates to new compounds, to their use as curing agents for preparing elastomers, and to the elastomers thus prepared. More particularly, it relates to 2-alkoxy-4,6-bis(alkyl-1-aziridinyl)-s-triazines and to a method of curing carboxy-containing polymers or prepolymers by incorporating therein a compound of the formula:

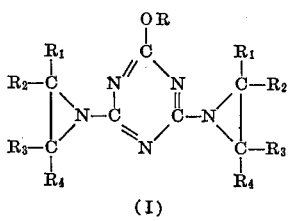
(I)

wherein R is alkyl of up to ten carbon atoms or alkoxy-alkyl of similar carbon content in each alkyl; $R_1$, $R_2$, $R_3$ and $R_4$ are individually selected from the group consisting of hydrogen and alkyl of up to four carbon atoms; and at least one of $R_1$, $R_2$, $R_3$ and $R_4$ is alkyl.

Carboxy-containing polymers have been used in the preparation of solid rocket fuels. In this usage, the uncured liquid polymers are thoroughly blended with the other components of the fuel and with suitable curing or gelation agents. Thorough blending with the gelling agent is necessary to ensure product uniformity. After blending, the liquid mixture is charged into the fuel chamber whereupon it cures or gels. Difficulties are often encountered with certain gelling agents which are themselves in solid form at ambient temperatures. To insure thorough blending, the curable mixture must be heated to effect solution of the curing agent or gelling agent. This in itself presents hazards if high temperatures are required. More importantly, high temperatures, while necessary for proper blending with solid curing agents, are detrimental to the mixtures in other respects. There are certain requirements as to reactivity which the gelling agent must meet. A certain "pot-life" (induction period) is necessary to allow transfer of the blended liquid fuel mix to the fuel chamber before gelation or solidification occurs. It is necessary that sufficient time be available before gelation so that this transfer may be made without premature solidificatoin. Many known agents normally are solids melting at 100° C. or higher, and exhibit high reactivity which is increased by the elevated temperatures required to effect thorough blending. In many cases the curing agent polymerizes under the influence of heat to form a solid polymer without going through a liquid stage. Obviously, the combination of high temperature for blending and high reactivity of curing agent will reduce allowable transfer times.

A further difficulty occasioned by high reactivity rates of certain curing agents is their tendency to produce an extremely hard, solid polymeric mass which is very brittle and prone to cracking. Cracking of the cured polymer is highly undesirable in any intended use thereof and is extremely dangerous in the case of solid rocket fuels, since the void or air space created by the crack or cracks in the polymer can result in explosions which can burst the fuel chamber or at least result in intermittent power surges instead of the desired steady rate of power production.

There is, therefore, the need in solid rocket fuels for curing agents for carboxy-containing polymers which are liquids at ordinary temperatures, provide adequate "pot-life" and eliminate cracking of cured polymers by reducing the hardness thereof. It is an object of this invention to provide such curing agents and to further provide cured polymers derived therefrom.

These and other objects have been accomplished by the present invention which is based upon the finding that the new 2-alkoxy-4,6-bis(alkyl-1-aziridinyl)-s-triazines of Formula I overcome the difficulties of former curing agents. The highly desirable nature of the compounds of the present invention as curing agents particularly in solid rocket fuels, is surprising for several reasons. First, the liquid state of these compounds at ordinary temperatures is unexpected since related compounds are solids. Second, the fact that these compounds, containing substituted aziridine rings have slower curing rates than similar compounds containing unsubstituted aziridine rings is unpredictable on the basis that many substituted aziridine rings are less stable than unsubstituted counterparts. They would therefore be expected to be more rapid in their curing action. An unexpected development of the present invention is the finding that wide variations in hardness of the cured polymers can be obtained by proper selection of the 2-alkoxy-4,6-bis (alkyl-1-aziridinyl)-s- triazine and, if desired, an auxiliary curing agent.

The compounds of the present invention can be prepared by reacting two moles of substituted aziridine with one mole of an alkoxydihalo-s-triazine according to the equation:

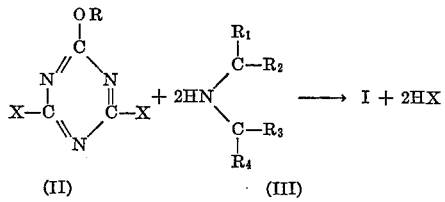
(II)               (III)

wherein the R's have the same significance as in Formula I and X is a halogen such as chlorine, bromine and iodine.

The alkoxydihalo-s-triazines can be prepared by reacting one mole of a suitable alcohol or alkoxyalkanol with one mole of cyanuric halide in the presence of an acid acceptor and generally a solvent medium such as acetone, dioxane, benzene, etc. The reactants are stirred at moderate temperatures (e.g., 25° C.) until the desired reaction is essentially complete.

Suitable acid acceptors include, for example, tertiary amines, such as triethylamine and pyridine, alkali metal carbonates and bicarbonates, such as potassium carbonate, sodium bicarbonate, etc. Sufficient acid acceptor is used to combine with all of the hydrogen halide liberated during the reaction.

Among the desirable alkoxydihalo-s-triazines that may be employed in preparing the 2-alkoxy-4,6-bis(alkyl-1-aziridinyl)-s-triazines of the present invention are included 2-methoxy-4,6-dichloro-s-triazine;
2-ethoxy-4,6-dichloro-s-triazine;
2-propoxy-4,6-dichloro-s-triazine;
2-pentoxy-4,6-dichloro-s-triazine;
2-(2-ethylhexoxy)-4,6-dichloro-s-triazine;
2-octyloxy-4,6-dichloro-s-triazine;
2-(2-methoxyethyl)-4,6-dichloro-s-triazine, etc., and corresponding bromine and iodine substituted counterparts.

Among the substituted aziridines of Formula III that may be employed in preparing the compounds of this invention are included 2-methylaziridine (1,2-propyleneimine); 2-ethylaziridine (1,2-butyleneimine); 2,3-dimethylaziridine (2,3-butyleneimine); 2,2-dimethylaziridine (2-methyl-1,2-propyleneimine), etc., The 2,2,3,3-tetra-alkyl substituted aziridines, preparable by the process described in J. Am. Chem. Soc. 82, 6088 (1960), are also useful in preparing the compounds of the present invention.

One mole of a compound of Formula II is reacted with at least two moles of a compound of Formula III in the presence of an acid acceptor and generally in an inert solvent. The acid acceptors and solvents previously enumerated are suitable. The amount of acid acceptor employed should be at least sufficient to react with all of the hydrogen halide liberated during the reaction. The reactants are stirred at moderate temperatures (e.g., 20–40° C.) until the desired reaction is essentially complete.

Compounds of Formula I are normally moderately viscous mobile liquids. After removal of the solvent, excess substituted aziridine and halide salt by-product, the products are usually of satisfactory purity for normal use as cross-linking or curing agents. (Attempts to purify said materials by distillation, even under reduced pressure, may result in their polymerization.)

An alternative process for preparing the compounds of the present invention is to react two moles of the substituted aziridine with cyanuric chloride first and then react the intermediate product with one mole of sodium alcoholate. Solvent, acid acceptor and reaction conditions are similar to those given in the appropriate steps of the procedure previously described. This is the preferred procedure, since it gives the desired compound with minimal amounts of impurities.

The compounds of this invention contain two aziridinyl groups and are reactive with monomeric and polymeric compounds having reactive hydrogens including alcohols, phenols, mercaptans, thiophenols, carboxylic acids, amines, etc. They are thus useful as chain-extending and cross-linking agents in the preparation of plastics and resins, textiles, varnishes, paper, etc. For example, they are effective curing agents for vulcanizable rubbery materials which serve as binders in solid rocket propellent compositions. Rubbery materials include homopolmyers of conjugated dienes and copolymers of conjugated dienes with materials copolymerizable therewith, as shown in U.S. Pat. No. 3,087,843. Of particular interest is their use in propellent compositions comprising an inorganic oxidizing salt and either a synthetic acid-terminated polymeric binder or a synthetic copolymer of a conjugated diene and an unsaturated carboxylic acid (see U.S. Pat. No. 3,087,844). The first type of polymer may be exemplified by the formula:

HOOC—Q—COOH wherein Q is a polymer chain, as for example, a polymer of a conjugated diene such as 1,3-butadiene. The second type may be exemplified by a copolymer of 1,3-butadiene and acrylic acid.

The compounds of the present invention are extremely useful as curing agents for the rocket propellent compositions described above, where there is a definite need for their liquidity, their slow curing rates to give extended "pot-lives," and their production of polymeric compositions of moderate hardness.

The compounds of this invention may be used in conjunction with any other suitable cross-linking agent for the purpose of modifying the physical properties of the cured polymeric product.

In the following examples, parts and percentages are by weight, unless otherwise specified.

EXAMPLE 1

Preparation of 2-methoxy-4,6-dichloro-s-triazine

Into a suitably equipped reactor was added 36.8 parts (0.2 mole) of cyanuric chloride, 200 ml. methanol and 33.6 parts (0.2 mole) of sodium bicarbonate dissolved in 25 ml. of water. The above mixture was stirred for about 30 minutes at 25 to 30° C. After this time, evolution of $CO_2$ had ceased and the mixture was poured over 500 ml. of an ice/water mixture and swirled for about five minutes at which time all of the ice had melted. The mixture was then filtered, the cake washed with water, dried by suction and recrystallized from hexane. A yield of 30 parts (83.3%) of white crystalline product was obtained, M.P. 89° C.

EXAMPLE 2

Preparation of 2-pentoxy-4,6-dichloro-s-triazine

To a suitably equipped reactor was added 92.2 parts (0.5 mole) of cyanuric chloride and 500 ml. of anhydrous acetone. After dissolution was complete, the solution was cooled to 0° C. and treated with 63.4 parts (0.72 mole) of amyl alcohol (pentanol). There was then added slowly 67.5 ml. (0.5 mole) of 2,4,6-trimethyl pyridine. When this addition was complete, the temperature rose slowly to 8° C. and slowly returned to 0° C. The reaction mixture turned to a deep red-brown color and stirring was continued at 0–5° C. for about 15 minutes. The mixture was then warmed to room temperature (about 25° C.) and stirred at this temperature for about three hours. The mixture was then clarified and drowned in one liter of an ice/water mixture. The resulting mixture was extracted with 400 ml. of ether and the ether extract was washed with water and dried over anhydrous sodium sulfate. The extract was distilled and a water white liquid, which boiled at 105–106° C. at a pressure equivalent to 1 mm. of mercury, was collected.

EXAMPLE 3

Following the procedures of the previous two examples, a number of intermediate 2-alkoxy-4,6-dichloro-s-triazines were prepared wherein the alkoxy group is that indicated and the nature of the product is shown in Table I.

TABLE I
[Preparation of various 2-alkoxy-4,6-dichloro-s-triazines]

| Alkoxy group | Procedure | Nature of product |
|---|---|---|
| $OCH_2CH_3$ | Example 1. | Solid m.p. 30° C. |
| $OCH_2CH_2CH_3$ | ---do-------- | Liquid oil at 0° C. |
| $OCH_2CH_2OCH_3$ | ---do-------- | Do. |
| $OCH_2CHCH_2CH_2CH_2CH_3$<br>$\quad\vert$<br>$\quad CH_2CH_3$ | Example 2. | Liquid heavy oil at 0° C. |
| $OCH_2(CH_2)_6CH_3$ | ---do-------- | Do. |

EXAMPLE 4

2-methoxy-4,6-bis(2-methyl-1-aziridinyl)-s-triazine

Into a suitably equipped reactor was added 12.0 parts (0.25 mole) of 1,2-propyleneimine and 21.0 parts (0.25 mole) of triethylamine dissolved in 200 ml. of benzene. This solution was cooled to 5–10° C. in an ice bath and to it was added a solution of 18.0 parts (0.1 mole) of 2-methoxy-4,6-dichloro-s-triazine in 100 ml. of benzene. The rate of addition was controlled so that the reaction temperature was maintained below 30° C. After the addition was complete, the mixture was stirred at 25–30° C. for one hour and then filtered. The filtrate was stripped of solvent to yield 15 parts of a pale yellow oil which had the proper elemental analyses for the desired product. The yield was 68.5% of theory.

EXAMPLE 5

2-methoxy-4,6-bis(2-ethyl-1-aziridinyl)-s-triazine

Following the procedure of Example 4 except that 14.2 parts (0.2 mole) of 2-ethylethyleneimine was substituted for the propyleneimine, the product was obtained as a pale amber clear oil in 96% yield.

Likewise, when the procedure of Example 4 is followed, except that an equivalent amount of 2-ethoxyethylethyleneimine is used as the imine reactant, the product, 2-methoxy-4,6-bis(2-ethoxyethyl-1-aziridinyl)-s-triazine is obtained.

EXAMPLE 6

Evaluation of 2-methoxy-4,6-bis(2-ethyl-1-aziridinyl)-s-triazine as chain extending agent To 20 parts of a carboxy-terminated polymer of 1,3-butadiene was added 1.24 parts of 2-methoxy-4,6-bis(2-ethyl-1-aziridinyl)-s-triazine. The triazine was readily incorporated into the polymer and the mixture was placed in an oven at 50° C. In five days the mixture changed from a thin liquid to an extremely viscous mass, evidence that the desired chain extension was obtained.

EXAMPLE 7

Following the procedure of Example 6, but substituting for the 2-methoxy-4,6-bis(2-ethyl-1-aziridinyl)-s-triazine, an equal amount of 2-methoxy-4,6-bis(2-methyl-1-aziridinyl)-s-triazine, a similar chain-extended polymer was obtained in a similar time period.

EXAMPLE 8

Following the procedure of Example 6, but substituting for the 2-methoxy-4,6-bis(2-ethyl-1-aziridinyl)-s-triazine, an equal amount of known tripropylenemelamine, there was obtained in three hours a nextremely hard (Shore Hardness 110) and brittle mass.

This example illustrates the short "pot-life" and undesirably hard cross-linked polymers obtained with conventional cross-linking agents. (In the presence of the oxidizing agent normally found in rocket fuel compositions, these difficulties would be more pronounced.)

EXAMPLE 9

Following the procedure of Example 6, but substituting for half the amount of 2-methoxy-4,6-bis(2-ethyl-1-aziridinyl)-s-triazine used therein, an equal amount of tripropylenemelamine, there was obtained in 24 hours, a cross-linked polymer of moderate hardness (Shore Hardness=50). This example illustrates the effectiveness of the compounds of the present invention in extending "pot-life" and altering the physical form of the cross-linked polymer when used in conjunction with conventional cross-linking agents.

EXAMPLE 10

Following the procedure of Example 9, but substituting for the 2-methoxy-4,6-bis(2-ethyl-1-aziridinyl)-s-triazine, an equal amount of 2-methoxy-4,6-bis(1-aziridinyl)-s-triazine, there was obtained in three hours an extremely hard (Shore Hardness=110) cross-linked polymer which displayed numerous cracks.

This example, when compared to Example 9, illustrates the superiority of the 2-alkoxy-4,6-bis(alkyl-1-aziridinyl)-s-triazines over the same triazine containing unsubstituted aziridinyl groups, in respect to hardness and curing rate of the polymer.

I claim:

1. Compounds of the formula:

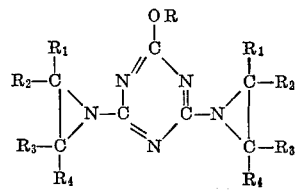

wherein R is an alkyl of up to ten carbon atoms or alkoxy-alkyl of up to ten carbon atoms in each alkyl grouping; and $R_1$, $R_2$, $R_3$ and $R_4$ are individually either hydrogen or alkyl of up to four carbon atoms and at least one of $R_1$, $R_2$, $R_3$ and $R_4$ is other than hydrogen.

2. The compound of claim 1 wherein R is methyl, each $R_1$ is methyl; and each $R_2$, $R_3$ and $R_4$ is hydrogen.

3. The compound of claim 1 wherein R is methyl; each $R_1$ is ethyl; and each $R_2$, $R_3$ and $R_4$ is hydrogen.

4. A composition comprising a vulcanizable rubbery elastomer and as a vulcanizing agent, an effective amount of a compound of claim 1.

5. The composition of claim 4 wherein the elastomer is a carboxy terminated, polymeric conjugated diene.

6. The composition of claim 4 wherein the elastomer is a carboxy-terminated polymer of 1,3-butadiene.

7. The vulcanizate of the polymeric composition of claim 4.

8. The vulcanizate of the polymeric composition of claim 5.

9. The vulcanizate of the polymeric composition of claim 6.

References Cited

UNITED STATES PATENTS

| | | | |
|---|---|---|---|
| 2,909,420 | 10/1959 | Gysin et al. | 260—249.8 X |
| 3,097,193 | 7/1963 | Gruver | 260—85.1 |
| 3,251,812 | 5/1966 | Hsieh | 260—94.7 X |
| 3,260,702 | 7/1966 | Murakami et al. | 260—77.5 |

FOREIGN PATENTS 927,347  5/1963  Great Britain.

JOSEPH L. SCHOFER, Primary Examiner

W. F. HAMROCK, Assistant Examiner